(12) United States Patent
Kushtagi et al.

(10) Patent No.: US 12,039,057 B2
(45) Date of Patent: Jul. 16, 2024

(54) IMPLEMENTING A CRYPTOGRAPHY AGENT AND A SECURE HARDWARE-BASED ENCLAVE TO PREVENT COMPUTER HACKING OF CLIENT APPLICATIONS

(71) Applicant: PayPal, Inc., San Jose, CA (US)

(72) Inventors: Harsha Kushtagi, Karnataka (IN); Manjesh Srinivasa, Austin, TX (US); Aman Kumar, Karnataka (IN)

(73) Assignee: PAYPAL, INC., San Jose, CA (US)

( * ) Notice: Subject to any disclaimer, the term of this patent is extended or adjusted under 35 U.S.C. 154(b) by 321 days.

(21) Appl. No.: 17/457,462

(22) Filed: Dec. 3, 2021

(65) Prior Publication Data
US 2023/0177171 A1  Jun. 8, 2023

(51) Int. Cl.
G06F 21/60 (2013.01)
G06F 21/44 (2013.01)
H04L 9/08 (2006.01)
H04L 9/40 (2022.01)

(52) U.S. Cl.
CPC ............ G06F 21/602 (2013.01); G06F 21/44 (2013.01); H04L 9/0894 (2013.01); H04L 63/0442 (2013.01)

(58) Field of Classification Search
CPC ....... H04L 9/14; H04L 9/0428; H04L 9/0825; H04L 9/3263; H04L 9/0819; H04L 9/0877; H04L 63/0428; H04K 9/0897
See application file for complete search history.

(56) References Cited

U.S. PATENT DOCUMENTS

| 8,312,272 B1* | 11/2012 | Serenyi | G06F 21/33 |
| | | | 713/168 |
| 2016/0285875 A1* | 9/2016 | Lenz | H04L 63/0853 |
| 2017/0024548 A1* | 1/2017 | Dorwin | G06F 16/9535 |
| 2017/0300668 A1* | 10/2017 | Bawa | G06F 21/629 |
| 2020/0236113 A1* | 7/2020 | Monica | H04L 9/50 |
| 2021/0266329 A1* | 8/2021 | Fuhry | H04L 63/083 |

OTHER PUBLICATIONS

International Search Report and Written Opinion for Application No. PCT/US2022/048266 mailed on Feb. 7, 2023, 14 pages.

* cited by examiner

*Primary Examiner* — Tom Y Chang
(74) *Attorney, Agent, or Firm* — HAYNES AND BOONE, LLP

(57) ABSTRACT

A cryptography agent is implemented to serve as an intermediary for a client application executing on an unsecured portion of a machine to bring greater hardware-based security to the client application. The cryptography agent does so by generating a public/private key pair for the client application and sealing the key pair inside an enclave that resides on a secured portion of the machine. The cryptography agent fetches confidential information for the client application from a secure server, where the confidential information is encrypted using the public key. The cryptography agent seals the confidential information using seal keys that are directly fused into hardware of the machine on which the enclave resides, which prevents the client application from accessing the confidential information in plaintext form. The client application sends commands to the cryptography agent, which performs operations within the enclave according to the commands once the client application is validated.

20 Claims, 5 Drawing Sheets

IMPLEMENTING A CRYPTOGRAPHY AGENT AND A SECURE HARDWARE-BASED ENCLAVE TO PREVENT COMPUTER HACKING OF CLIENT APPLICATIONS

BACKGROUND

Field of the Invention

The present application generally relates to computer security. More particularly, the present application involves using hardware-based encryption to provide heightened security to client applications, according to various embodiments.

Related Art

Rapid advances have been made in the past several decades in the fields of computer technology and telecommunications. Sensitive information, such as cryptographic keys or authentication credentials, may be stored on computers and/or transmitted among different computers. Unfortunately, existing electronic information security schemes have not been satisfactory in all respects. For example, sensitive information sent to, or accessed by, client applications may be vulnerable to hacking or may otherwise become compromised. Therefore, what is needed is a system, device, or method to offer a greater degree of hardware-based electronic information security protection to client applications than was previously possible.

Figure 1:
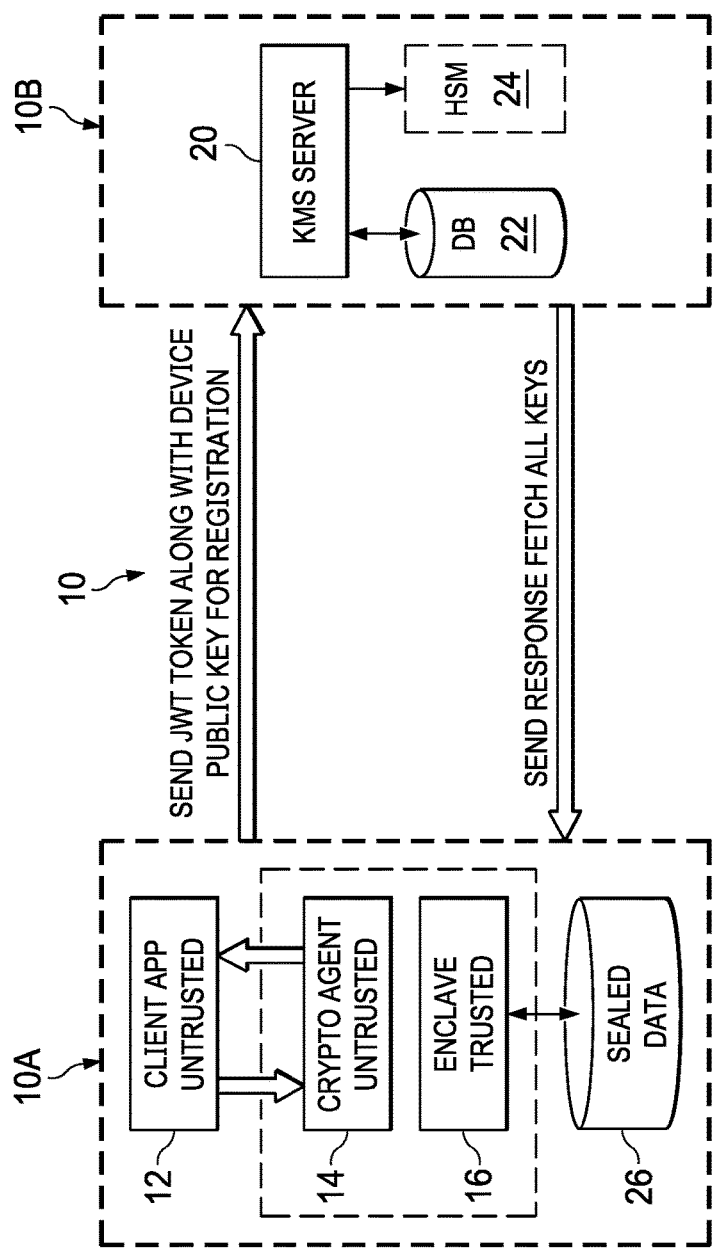
FIG. 1 is a block diagram of a networked architecture according to various aspects of the present disclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

It is to be understood that the following disclosure provides many different embodiments, or examples, for implementing different features of the present disclosure. Specific examples of components and arrangements are described below to simplify the present disclosure. These are, of course, merely examples and are not intended to be limiting. Various features may be arbitrarily drawn in different scales for simplicity and clarity.

The present disclosure pertains to a low-cost approach to provide enhanced (e.g., server-grade) hardware-based security to client applications without the difficulty and expense that such hardware-based security conventionally requires. In more detail, secure servers capable of generating confidential information such as cryptographic keys may be protected using hardware-based security mechanisms, such as via a hardware security module (HSM). However, HSM-level security is expensive, and maintenance of the HSM (and/or the server for which it is protecting) is difficult. As such, HSM-level security is typically not available on client applications, which may be end user computers (even computer servers) that communicate with the secure server to perform certain operations such as cryptographic operations.

Most client applications (or the host machines on which the client applications are executed) have some type of security mechanisms, but there are gaps in the protection offered by the existing security mechanisms for the client applications. For example, when sensitive information (e.g., the cryptographic keys) are sent to the client applications, it may be accessible in plaintext format. If a malicious actor gains access to the client application, the sensitive information may be easily compromised. To exacerbate the situation, the same sensitive information (e.g., the same set of cryptographic keys) may be granted access by the secure server to multiple client applications. As such, if the sensitive information is compromised by one of the client applications, it could jeopardize the security of all the client applications using the sensitive information as well.

To overcome the shortcomings of conventional security protection on the client side, the present application implements a cryptography agent and a secure enclave on the client-side host machine. The secure enclave resides in a hardware-based secured portion of the host machine, and the cryptography agent, along with the client application, resides in the unsecured portion of the host machine. The cryptography agent acts as an intermediary for the client application, so that the client application never communicates directly with the secure server and never has direct access to the sensitive information sent by the secure server. The cryptography agent also uses seal keys that are directly fused into the hardware of the host machine to seal (e.g., encrypt) the sensitive information sent by the secure server. The sealed sensitive information is then stored securely within the secure enclave and is tamper-proof. The cryptography agent also provides an encrypted token to the client application, so that the client application can use such a token as an authentication token to authenticate itself to the cryptography agent. Once the client application is successfully authenticated, the cryptography agent may execute commands sent by the client application to perform operations within the secure enclave. The results of the operations are sent by the cryptography agent to the client application. By doing so, safety and security are improved on the client side, since the client application does not have direct access to sensitive information in plaintext format, and since the sensitive information is sealed (using hardware-based encryption) and stored within the tamper-resistant secure enclave. In other words, the present disclosure provides server-grade hardware-based security to client applications, and therefore improves the functionality of a computer. The inventive ideas of the present disclosure are also integrated into a practical application, for example into the cryptography agent and the secure enclave, which are specifically implemented to address the gaps of electronic security protection in client applications that otherwise lack the expensive server-grade hardware-based security protection.

The various aspects of the present disclosure will now be discussed below in more detail with reference to FIGS. 1-6.

FIG. 1 illustrates a block diagram of an architecture 10 (or context) involving electronic information security protection according to embodiments of the present disclosure. The architecture includes a client side 10A and a server side 10B. The client side 10A may refer to one or more computers that may be used to host one or more client applications. For example, the client side 10A may include computers used by a payment service provider (such as PayPal™, Inc. of San Jose, CA) to host its payment applications. In the illustrated embodiment, the client side 10A may include a client application 12 (hereinafter interchangeably referred to as ClientApp), a cryptography agent 14 (hereinafter interchangeably referred to as Crypto Agent), and a secure enclave 16 (hereinafter interchangeably referred to as Enclave).

The client application 12 and the cryptography agent 14 each reside in an unsecure or untrusted portion of an electronic memory of one or more computers of the client side 10A, but the enclave 16 resides in (or corresponds to) a secure or trusted portion of the electronic memory of the one or more computers of the client side 10A. In that regard, the enclave 16 may utilize a form of runtime encryption to secure process memory using hardware-based security. The secure or trusted portion of the electronic memory may be a private region of a hard drive/disk or a private region of a random access memory (RAM) that is isolated from the rest of the electronic memory, and it is encrypted using hardware-based resources (e.g., keys) that are directly fused onto the machine itself (e.g., fused onto the motherboard). In some embodiments, the enclave 16 includes a special type of integrated circuit (IC) chip where the hardware keys are directly fused onto one or more hardware resources. These keys that are fused onto the hardware resources may be made available to a process (e.g., a running instance of an application) that executes within the enclave 16. The keys fused into the hardware may also be referred to as seal keys, which are not passed around to entities outside the enclave 16 and are never given in plaintext format. The seal keys are used to execute operations such as encryption or decryption within the enclave 16.

In a non-limiting embodiment, INTEL™ Software Guard Extensions (SGX)—a security instruction set available in a subset of Intel CPUs—may be used to implement the enclave 16. Among other things, INTEL™ SGX allows developers to create private enclaves in a computer's memory and utilizes hardware-based encryption to allow users to protect sensitive data by storing the sensitive data in the enclave. Effectively, INTEL™ SGX helps keep users' sensitive data from being revealed or modified by creating a trusted execution environment within the electronic memory of a computer.

The server side 10B includes a key management system (KMS), which is (or includes) a secure server. The KMS 20 may be used as a vault to store confidential information, such as digital keys, authentication credentials, certificates, personal identification information (PII), etc., in a centralized repository. In some embodiments, the KMS 20 may store the confidential information in a database (DB) 22. The security of the KMS 20 is enhanced through a hardware security module (HSM) 24. In that regard, the HSM 24 includes a physical hardware device (e.g., a computing device) that safeguards and manages the confidential information (e.g., digital keys, authentication credentials, certificates, PII) at least in part via encryption and decryption and/or other forms of cryptography. In some embodiments, the HSM 24 may include a plug-in card or another suitable external device that attaches directly into the KMS 20. In some embodiments, the HSM 24 may include one or more secure crypto-processor chips, which may also be protected by tamper-evident or tamper-resistant packaging. These crypto-processor chips are configured to prevent tampering and/or bus probing. In some embodiments, the HSM 24 may be certified to internationally-recognized standards such as Common Criteria or Federal Information Processing Standard (FIPS). Through the implementation and use of the HSM 24, the confidential information can be safely and securely stored on the KMS 20 with little to no chance of being improperly accessed or otherwise compromised.

However, when the confidential information is transmitted between the server side 10B (e.g., KMS 20) and the client side 10A (e.g., client application 12), such confidential information may become vulnerable. For example, the confidential information may be sent in an unencrypted format (e.g., a plaintext format) when it is sent from the KMS 20 to the client side 10A. As such, a malicious actor may use various side channel attack techniques to gain unauthorized access to the confidential information. As non-limiting examples, the side channel attacks may include: cache attacks, power monitoring attacks, electromagnetic attacks, acoustic cryptanalysis, differential fault analysis, data remanence, etc. Regardless of how the malicious actor obtains the unauthorized access to the confidential information, once such an unauthorized access is obtained, the malicious actor may use the confidential information to gain access to other types of confidential information used by the client application 12, or to gain unauthorized access to other client applications (e.g., ones that are also running on the machines of the client side 10A) that share the same confidential information with the client application 12.

To prevent malicious actors from gaining unauthorized access to the confidential information, and to enhance the security of the client side 10A, the client application 12 herein does not communicate directly with the server side 10B according to the various aspects of the present disclosure. Instead, the cryptography agent 14 serves as an intermediary between the client application 12 and the KMS 20, as well as an intermediary between the client application 12 and the enclave 16. For example, the cryptography agent 14 may send, to the KMS 20 on behalf of the client application 12, a JavaScript Object Notation (JSON) Web Token (also referred to herein interchangeably as a JWT token) along with a device public key for registration. The KMS 20 may then send a response (which may fetch all the keys) to the cryptography agent 14, which will then interact with the enclave 16 to seal the fetched keys (e.g., via encryption) as sealed data 26, such that the client application 12 does not have direct access to the unsealed version of the keys fetched from the KMS 20.

Figure 2:
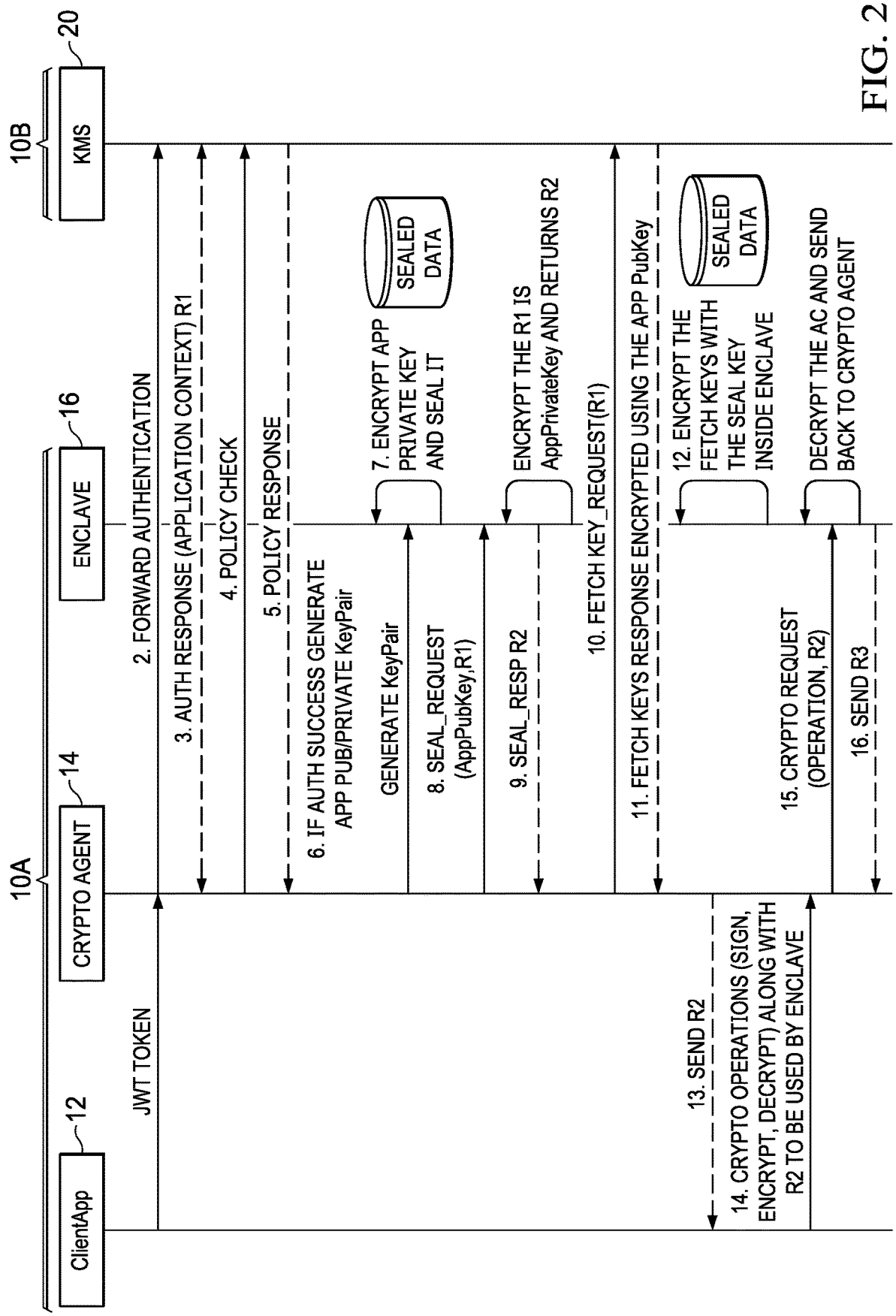
FIG. 2 is a block diagram illustrating a process flow according to various aspects of the present disclosure.

FIG. 2 is a block diagram that illustrates the process flow between the various entities of FIG. 1 according to embodiments of the present disclosure. In step 1 of the process flow, the client application 12 sends a JWT token to the cryptography agent 14. Such a JWT token may be received by the client application 12 from the KMS 20 as a part of an initial registration (which occurred before step 1 of FIG. 2 is performed) of the client application 12 with the KMS 20. The JWT token may contain authentication credentials of the client application 12, as well as information such as the name of the client application 12, permissions given to the client application 12, etc. The JWT token may be signed using a private certificate that resides in the KMS 20. In some embodiments, the JWT token may be a temporary token and has a relatively short time duration (e.g., 1 hour or 1 day). Using the JWT token, the client application 12 makes a call to the cryptography agent 14 to authenticate itself (the client application) to the KMS 20.

In a step 2 of the process flow, the cryptography agent 14 receives the JWT token from the client application 12 and forwards the JWT token to the KMS 20 for further authentication.

In a step 3 of the process flow, the KMS 20 verifies the JWT token and authenticates the client application 12 accordingly. If the authentication of the client application 12 is successful, the KMS 20 generates an application context for the client application 12 as a part of the authentication response, and sends the application context to the cryptography agent 14 (but not to the client application 12 directly). The application context may be generated in the form of a token, which may be interchangeably referred to as a token R1 hereinafter. The token R1 may have a longer time duration than the JWT token, and it is generated specifically for the client application 12 and not shared with any other client application from the client side 10A.

In a step 4 of the process flow, the cryptography agent 14 communicates with the KMS 20 to perform a policy check on the client application 12 to determine whether the instance of the client application 12 is authorized to communicate with the KMS 20. In some embodiments, the policy check is performed by obtaining, from the KMS 20, a set of policies that govern the rights and privileges of the client application 12. As a non-limiting example, if the machine on the client side 10A already has security issues that were previously known, then the calls from the client application 12 to the KMS 20 are unauthorized and should be blocked. In some embodiments, the policy check may be a scheduled task that is repeated periodically by the cryptography agent 14. In some embodiments, the performance of step 4 is optional, and the policies are sent to the cryptography agent 14 along with the token R1 (e.g., the application context) in step 3 instead.

In a step 5 of the process flow, the cryptography agent 14 executes a policy response based on the policies, regardless of whether the policies are obtained from the KMS 20 in step 4 or as a part of the token R1 in step 3. If the policies indicate that the client application 12 is not authorized to perform operations such as cryptographic operations, the rest of the process flow may continue. If the policies indicate that the client application 12 is not authorized to perform operations such as cryptographic operations, the cryptography agent 14 will prevent the client application 12 from executing the operations, since according to the various aspects of the present disclosure, the client application 12 cannot execute these operations independently and must utilize the cryptography agent 14 to perform these operations, as discussed below in more detail.

In some embodiments, the policy response effectively allows the KMS 20 to revoke previously issued keys that have been stored locally on the client side 10A, which was not possible in traditional implementations. For example, the KMS 20 may have granted one or more keys (or other types of confidential information) to the client application 12, which are now stored locally on the client side 10A. The one or more keys may be stored (e.g., in a computer cache) either in the unsecured portion of the host machine on which the client application 12 resides, or in the secured portion of the host machine (e.g., within the enclave 16 as encrypted keys). In traditional systems where the cryptography agent 14 is not implemented and the policy check/response is not performed, when the KMS 20 decides to revoke permissions previously granted to a client application, it may only be able to delete keys associated with that client application from the server side 10B, but not from the client side 10A. As a result, the keys stored on the client side 10A may be vulnerable for being improperly accessed by unauthorized entities, even though the client application may not be actively running anymore.

In contrast, the process flow of the present disclosure utilizes the policy check discussed above to verify whether the client application 12 is authorized to perform certain operations and/or whether certain keys previously granted to the client application 12 (that are stored locally on the client side 10A) should be deleted. If the policies indicate that one or more keys previously granted to the client application 12 should be deleted, the cryptography agent 14 may delete them from the client side 10A. For example, if the keys are stored in the unsecured portion of the host machine on the client side 10A in unencrypted form, the cryptography agent 14 may simply delete them. If the keys are sealed in the secured portion (e.g., in the enclave 16) of the host machine in encrypted form—as a result of steps 11-12 of the process flow being performed, as discussed below in more detail—the cryptography agent 14 may first unseal the keys by decrypting them, and then delete the unsealed (and now unencrypted) keys. By adding the capability to delete the keys previously issued to the client application 12 from the client side 10A, the present disclosure enhances the security and versatility of the computer systems herein.

In a step 6 of the process flow, in response to a successful authentication or authorization of the client application 12, the cryptography agent 14 generates a key pair that includes a public key and private key for the client application 12. In some embodiments, the keypair may be an asymmetric key pair. In some embodiments, the cryptography agent 14 generates the keypair using libraries available within the enclave 16, such that the keypair generation may be performed within the enclave 16 for enhanced security. Since the keypair may be generated within the enclave 16, which is tamper-proof, the keypair is resistant to hacking, such as the side channel attacks discussed above. In some embodiments, the enclave 16 has to go through an attestation process (either using a secure server or an attestation server) by sending some information related to the hardware (e.g., the processor) of the client side 10A.

In a step 7 of the process flow, the cryptography agent 14 seals the private key and the token R1 (e.g., the token corresponding to the application context associated with the client application 12) within the enclave 16. The sealing may be performed at least in part by encrypting the private key and the token R1 with the seal keys (e.g., the keys directly fused into the hardware resource of the host machine) of the enclave 16. The sealed private key and the token R1 are stored within the enclave 16 as sealed data. By sealing and storing the private key and the token R1, the present disclosure ensures that the client application 12 does not have direct access to them, and therefore the client application 12 or malicious actors taking advantage of the vulnerabilities of the client application 12 are prevented from compromising the sensitive data such as the private key or the data contained within the token R1.

In a step 8 of the process flow, the cryptography agent 14 sends a sign request (also referred to as a seal request) to the enclave 16, wherein the sign request includes the public key generated in step 6, along with the token R1. Using the public key, the enclave 16 encrypts the token R1 to generate a token R2, which is or includes an encrypted version of the token R1. Again, the encryption of the token R1 is performed within the secure electronic memory of the enclave 16. Alternatively, the token R2 may be generated by encrypting the token R1 with the seal key discussed above, and such an encryption also takes place within the secure electronic memory of the enclave 16.

In a step 9 of the process flow, the token R2 generated within the enclave 16 is sent to the cryptography agent 14. The generation and transmission of the token R2 by the enclave 16 to the cryptography agent 14 may be referred to as an attestation process. In a later step (e.g., step 12 discussed below), the token R2 is sent by the cryptography agent 14 to the client application 12. The client application 12 may then use the token R2 to communicate with the KMS 20 through the cryptography agent 14 (e.g., by using the cryptography agent 14 as an intermediary).

In a step 10 of the process flow, the cryptography agent 14 sends a request to the KMS 20 to fetch confidential information for the client application 12. The confidential information may include cryptographic keys for the client application 12, and therefore the request may also be referred to as a fetch-keys request. In some embodiments, the fetch-keys request includes, or is sent along with, the token R1 and the public key. When the KMS 20 receives the fetch-keys request, it verifies the token R1 using a remote attestation protocol, such as INTEL™ Attestation Service.

In a step 11 of the process flow, after a successful verification of the token R1, the KMS 20 retrieves the various requested cryptographic keys (or other types of suitable confidential information) for the client application 12 from its secure persistent electronic storage, for example from the database 22 using the HSM 24 (see FIG. 1). The KMS 20 then uses the public key (received in step 10) to encrypt the retrieved cryptographic keys or other confidential information. Thereafter, the KMS 20 sends the encrypted cryptographic keys (or other encrypted confidential information) to the cryptography agent 14 as a fetch-keys response. By encrypting the cryptographic keys and sending the encrypted cryptographic keys to the cryptography agent 14 (but not to the client application 12), the present disclosure enhances electronic information security at least in part by:

1. preventing the client application 12 (which is vulnerable to malicious attacks such as side channel attacks) from having direct access to confidential information such as the cryptographic keys; and
2. ensuring that the confidential information received by the client side 10A is not in plaintext format when it resides in unsecured memory.

In other words, even though the cryptography agent 14 (and not the client application 12) receives the confidential information from the KMS 20, the cryptography agent 14 still does not have direct access to the contents of the confidential information, since it is encrypted by the public key. In order for the client application 12 to use the encrypted confidential information, for example, by using the cryptographic keys to perform cryptographic operations, the encrypted confidential information must first be decrypted inside the enclave 16. The operations that the client application 12 desires to perform may then be performed using the decrypted confidential information (e.g., decrypted cryptographic keys) within the enclave, where the process memory of the enclave itself is encrypted from other applications such as the client application 12. As such, even if the confidential information is decrypted into plaintext format within the enclave 16, there is little risk of compromising or exposing the plaintext format confidential information to malicious actors.

In a step 12 of the process flow, within the enclave 16 and using the private key generated in step 6, the cryptography agent 14 decrypts the confidential information (e.g., cryptographic keys) fetched from the KMS 20. After the confidential information is decrypted, the cryptography agent 14 then uses the one or more seal keys (e.g., the keys that are directly fused into the hardware of the host machine) to seal the decrypted confidential information within the enclave 16 as sealed data. In some embodiments, the one or more seal keys include the secret keys provided by INTEL™ SGX (or another suitable hardware-based security protection service offered by another provider). While being stored in the enclave 16, the sealed data is protected by the hardware-based security protection service and remains tamper-proof and resistant to attacks from malicious actors. In this manner, the present disclosure effectively provides server-grade hardware-based security (conventionally available only on the server side 10B) to the client side 10A, which is an improvement of computer functionality over existing implementations of client side architecture.

In a step 13 of the process flow, the cryptography agent 14 sends the token R2—which includes an encrypted version of the token R1—to the client application 12. The client application 12 may then use the token R2 to interact with the cryptography agent 14 to get intended operations executed within the enclave 16. It is understood that the step 13 need not necessarily be performed after the step 12 of the process flow. In other embodiments, the step 13 may be performed following step 9 of the process flow, that is, the cryptography agent 14 may send the token R2 to the client application 12 after the generation of the token R2 and before the cryptography agent 14 sends the fetch-keys request to the KMS 20.

In a step 14 of the process flow, the cryptography agent 14 receives a request from the client application 12 to perform one or more operations, along with the commands for the requested operations. In some embodiments, the operations include cryptographic operations, and the received commands include encrypt, decrypt, sign, and verify. The request from the client application 12 also includes, or is accompanied by, the token R2 that was previously sent to the client application 12 by the cryptography agent 14. The client application 12 may use the token R2 (which includes the application context associated with client application 12) as a validation token for itself, so that the cryptography agent 14 can validate or verify that the client application 12 is actually allowed to perform the requested operations. Since the token R2 is in decrypted form, it is resistant to tampering even if it is intercepted by a malicious actor. Furthermore, even if the rest of the request sent by the cryptography agent 14 contains plaintext information, it still does not raise the security risk, since the plaintext information will not contain confidential data (e.g., it will not include the cryptographic keys sent by the KMS 20), even if the plaintext information is intercepted by a malicious actor.

In a step 15 of the process flow, the cryptography agent 14 decrypts the token R2 (received from the client application 12) within the enclave 16. The decryption may be performed using either the private key or with the seal key, depending on how the token R1 was decrypted to generate the token R2. Based on the decrypted token R2, the cryptography agent 14 may determine whether the client application 12 is authorized to perform the requested operations. For example, the cryptography agent 14 may compare the information from the token R1 with the information extracted from the decrypted token R2, and if there is a match, then the cryptography agent 14 may determine that the client application 12 is indeed authorized to perform the requested operations, and therefore the client application 12 is successfully validated. In response to the successful validation of the client application 12, the cryptography agent 14 will perform the operations (requested by client application 12) within the enclave 16, where the confidential information (e.g., the cryptographic keys) are used to perform the operations. Again, the client application 12 itself does not perform the operations directly but rather uses the cryptography agent 14 as an intermediary to perform the operations, and the fact that the operations are performed within the enclave 16 further minimizes security risks.

In a step 16 of the process flow, after the operations have been performed, the cryptography agent 14 sends the result of the performed operations back to the client application 12. In some embodiments, the result of the performed operations may be in the form of a token R3.

It is understood that the process flow may include a plurality of steps performed before, during, or after the steps 1-16 herein. For example, the process flow may include a step of registration between the client application 12 and the KMS 20 that is performed before the step 1 herein. As another example, the process flow may include a plurality of steps performed after the step 16 herein, where the client application 12 sends additional requests (along with the token R2) to perform further operations to the cryptography agent 14. The cryptography agent 14 then performs the further operations within the enclave 16 after validating client application 12 based on the token R2, and the cryptography agent 14 then sends the result of the further operations back to client application 12.

Figure 3:
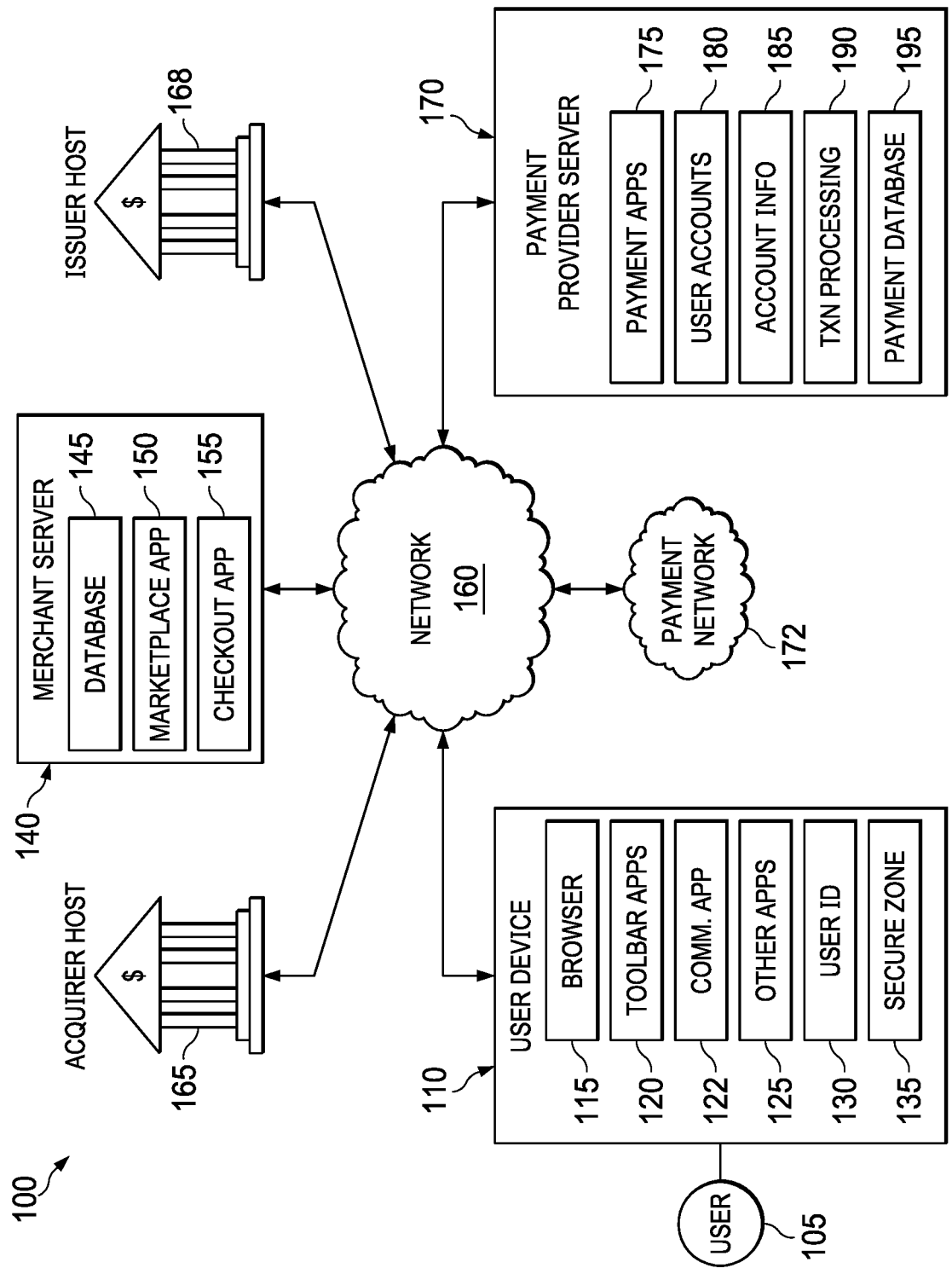
FIG. 3 is a block diagram of a system of conducting electronic transactions according to various aspects of the present disclosure.

FIG. 3 is a block diagram of a networked system 100 or architecture suitable for conducting electronic online transactions according to an embodiment. Networked system 100 may comprise or implement a plurality of servers and/or software components that operate to perform various payment transactions or processes. Exemplary servers may include, for example, stand-alone and enterprise-class servers operating a server OS such as a MICROSOFT™ OS, a UNIX™ OS, a LINUX™ OS, or other suitable server-based OS. It can be appreciated that the servers illustrated in FIG. 3 may be deployed in other ways and that the operations performed and/or the services provided by such servers may be combined or separated for a given implementation and may be performed by a greater number or fewer number of servers. One or more servers may be operated and/or maintained by the same or different entities.

The system 100 may include a user device 110, a merchant server 140, a payment provider server 170, an acquirer host 165, an issuer host 168, and a payment network 172 that are in communication with one another over a network 160. Payment provider server 170 may be maintained by a payment service provider, such as PayPal™, Inc. of San Jose, CA A user 105, such as a consumer, may utilize user device 110 to perform an electronic transaction using payment provider server 170. For example, user 105 may utilize user device 110 to visit a merchant's web site provided by merchant server 140 or the merchant's brick-and-mortar store to browse for products offered by the merchant. Further, user 105 may utilize user device 110 to initiate a payment transaction, receive a transaction approval request, or reply to the request. Note that transaction, as used herein, refers to any suitable action performed using the user device, including payments, transfer of information, display of information, etc. Although only one merchant server is shown, a plurality of merchant servers may be utilized if the user is purchasing products from multiple merchants.

User device 110, merchant server 140, payment provider server 170, acquirer host 165, issuer host 168, and payment network 172 may each include one or more electronic processors, electronic memories, and other appropriate electronic components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 160. Network 160 may be implemented as a single network or a combination of multiple networks. For example, in various embodiments, network 160 may include the Internet or one or more intranets, landline networks, wireless networks, and/or other appropriate types of networks.

User device 110 may be implemented using any appropriate hardware and software configured for wired and/or wireless communication over network 160. For example, in one embodiment, the user device may be implemented as a personal computer (PC), a smart phone, a smart phone with additional hardware such as NFC chips, BLE hardware etc., wearable devices with similar hardware configurations such as a gaming device, a Virtual Reality Headset, or that talk to a smart phone with unique hardware configurations and running appropriate software, laptop computer, and/or other types of computing devices capable of transmitting and/or receiving data, such as an iPad™ from Apple™.

User device 110 may include one or more browser applications 115 which may be used, for example, to provide a convenient interface to permit user 105 to browse information available over network 160. For example, in one embodiment, browser application 115 may be implemented as a web browser configured to view information available over the Internet, such as a user account for online shopping and/or merchant sites for viewing and purchasing goods and services. User device 110 may also include one or more toolbar applications 120 which may be used, for example, to provide client-side processing for performing desired tasks in response to operations selected by user 105. In one embodiment, toolbar application 120 may display a user interface in connection with browser application 115.

User device 110 also may include other applications to perform functions, such as email, texting, voice and IM applications that allow user 105 to send and receive emails, calls, and texts through network 160, as well as applications that enable the user to communicate, transfer information, make payments, and otherwise utilize a digital wallet through the payment provider as discussed herein.

User device 110 may include one or more user identifiers 130 which may be implemented, for example, as operating system registry entries, cookies associated with browser application 115, identifiers associated with hardware of user device 110, or other appropriate identifiers, such as used for payment/user/device authentication. In one embodiment, user identifier 130 may be used by a payment service provider to associate user 105 with a particular account maintained by the payment provider. A communications application 122, with associated interfaces, enables user device 110 to communicate within system 100. User device 110 may also include other applications 125, for example the mobile applications that are downloadable from the Appstore™ of APPLE™ or GooglePlay™ of GOOGLE™.

In conjunction with user identifiers 130, user device 110 may also include a secure zone 135 owned or provisioned by the payment service provider with agreement from device manufacturer. The secure zone 135 may also be part of a telecommunications provider SIM that is used to store appropriate software by the payment service provider capable of generating secure industry standard payment credentials as a proxy to user payment credentials based on user 105's credentials/status in the payment providers system/age/risk level and other similar parameters.

Still referring to FIG. 3, merchant server 140 may be maintained, for example, by a merchant or seller offering various products and/or services. The merchant may have a physical point-of-sale (POS) store front. The merchant may be a participating merchant who has a merchant account with the payment service provider. Merchant server 140 may be used for POS or online purchases and transactions. Generally, merchant server 140 may be maintained by anyone or any entity that receives money, which includes charities as well as retailers and restaurants. For example, a purchase transaction may be payment or gift to an individual. Merchant server 140 may include a database 145 identifying available products and/or services (e.g., collectively referred to as items) which may be made available for viewing and purchase by user 105. Accordingly, merchant server 140 also may include a marketplace application 150 which may be configured to serve information over network 160 to browser 115 of user device 110. In one embodiment, user 105 may interact with marketplace application 150 through browser applications over network 160 in order to view various products, food items, or services identified in database 145.

According to various aspects of the present disclosure, the merchant server 140 may also host a website for an online marketplace, where sellers and buyers may engage in purchasing transactions with each other. The descriptions of the items or products offered for sale by the sellers may be stored in the database 145. For example, the descriptions of the items may be generated (e.g., by the sellers) in the form of text strings. These text strings are then stored by the merchant server 140 in the database 145.

Merchant server 140 also may include a checkout application 155 which may be configured to facilitate the purchase by user 105 of goods or services online or at a physical POS or store front. Checkout application 155 may be configured to accept payment information from or on behalf of user 105 through payment provider server 170 over network 160. For example, checkout application 155 may receive and process a payment confirmation from payment provider server 170, as well as transmit transaction information to the payment provider and receive information from the payment provider (e.g., a transaction ID). Checkout application 155 may be configured to receive payment via a plurality of payment methods including cash, credit cards, debit cards, checks, money orders, or the like.

Payment provider server 170 may be maintained, for example, by an online payment service provider which may provide payment between user 105 and the operator of merchant server 140. In this regard, payment provider server 170 may include one or more payment applications 175 which may be configured to interact with user device 110 and/or merchant server 140 over network 160 to facilitate the purchase of goods or services, communicate/display information, and send payments by user 105 of user device 110.

Payment provider server 170 also maintains a plurality of user accounts 180, each of which may include account information 185 associated with consumers, merchants, and funding sources, such as credit card companies. For example, account information 185 may include private financial information of users of devices such as account numbers, passwords, device identifiers, usernames, phone numbers, credit card information, bank information, or other financial information which may be used to facilitate online transactions by user 105. Advantageously, payment application 175 may be configured to interact with merchant server 140 on behalf of user 105 during a transaction with checkout application 155 to track and manage purchases made by users and which and when funding sources are used.

A transaction processing application 190, which may be part of payment application 175 or separate, may be configured to receive information from a user device and/or merchant server 140 for processing and storage in a payment database 195. Transaction processing application 190 may include one or more applications to process information from user 105 for processing an order and payment using various selected funding instruments, as described herein. As such, transaction processing application 190 may store details of an order from individual users, including funding source used, credit options available, etc. Payment application 175 may be further configured to determine the existence of and to manage accounts for user 105, as well as create new accounts if necessary.

In some embodiments, the cryptography agent 14 and the enclave 16 discussed above may be implemented on the payment provider server 170, for example, when the payment provider server 170 communicates with a KMS such as the KMS 20 to obtain cryptographic keys. In other embodiments, the cryptography agent 14 and the enclave 16 discussed above may also be implemented on the merchant server 140 or even on the user device 110 instead, for example, in situations where the merchant server 140 and/or the user device 110 serves as the client side machine to communicate with a server.

Still referring to FIG. 3, the payment network 172 may be operated by payment card service providers or card associations, such as DISCOVER™, VISA™, MASTERCARD™, AMERICAN EXPRESS™, RUPAY™, CHINA UNION PAY™, etc. The payment card service providers may provide services, standards, rules, and/or policies for issuing various payment cards. A network of communication devices, servers, and the like also may be established to relay payment related information among the different parties of a payment transaction.

Acquirer host 165 may be a server operated by an acquiring bank. An acquiring bank is a financial institution that accepts payments on behalf of merchants. For example, a merchant may establish an account at an acquiring bank to receive payments made via various payment cards. When a user presents a payment card as payment to the merchant, the merchant may submit the transaction to the acquiring bank. The acquiring bank may verify the payment card number, the transaction type and the amount with the issuing bank and reserve that amount of the user's credit limit for the merchant. An authorization will generate an approval code, which the merchant stores with the transaction.

Issuer host 168 may be a server operated by an issuing bank or issuing organization of payment cards. The issuing banks may enter into agreements with various merchants to accept payments made using the payment cards. The issuing bank may issue a payment card to a user after a card account has been established by the user at the issuing bank. The user then may use the payment card to make payments at or with various merchants who agreed to accept the payment card.

Figure 4:
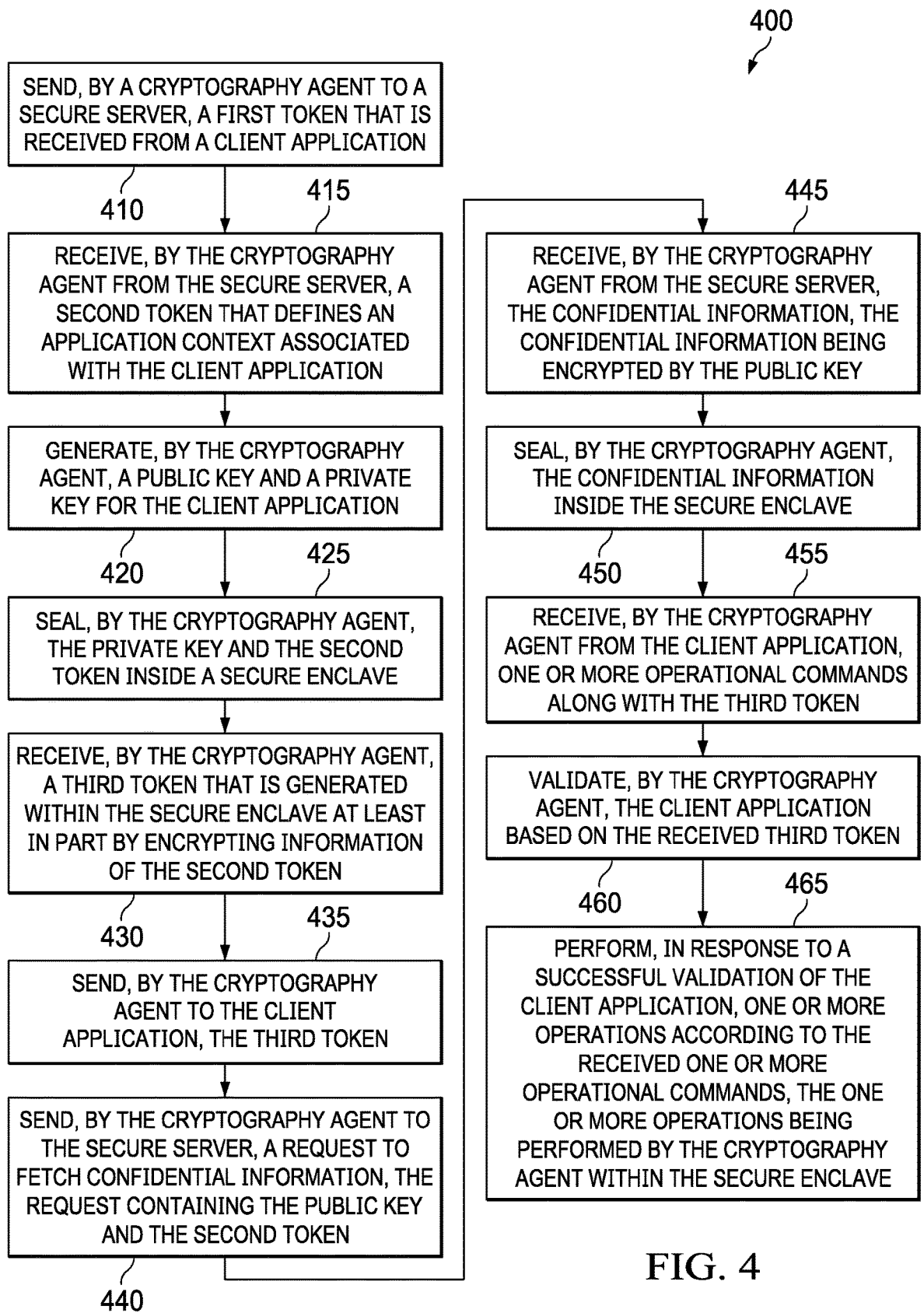
FIG. 4 is a flowchart illustrating a method of performing cryptography according to various aspects of the present disclosure.

FIG. 4 is a flowchart illustrating a method 400 of providing server-grade hardware-based security to a client application according to one embodiment. Additional details of this and other steps of the method 400 are described herein in other portions. The method 400 includes a step 410 to send, by a cryptography agent to a secure server, a first token that is received from a client application. For example, the step 410 may be performed by the cryptography agent 14, which receives the JWT token (as an embodiment of the first token) from the client application 12 and sends it to the KMS 20.

The method 400 includes a step 415 to receive, by the cryptography agent from the secure server, a second token that defines an application context associated with the client application. For example, the step 415 may be performed by the cryptography agent 14, which receives the token R1 (e.g., the application context associated with the client application 12) as an embodiment of the second token from the KMS 20.

The method 400 includes a step 420 to generate, by the cryptography agent, a public key and a private key for the client application. For example, the step 420 may be performed by the cryptography agent 14, which generates the public and private key pair.

The method 400 includes a step 425 to seal, by the cryptography agent, the private key and the second token inside a secure enclave. For example, the step 425 may be performed by the cryptography agent 14, which uses the hardware-based seal keys to seal the private key and the token R1 inside the enclave 16.

The method 400 includes a step 430 to receive, by the cryptography agent, a third token that is generated within the secure enclave at least in part by encrypting information of the second token. For example, the step 430 may be performed by the cryptography agent 14, which receives the token R2 (as an embodiment of the third token) that is generated within the enclave as an encrypted version of the token R1.

The method 400 includes a step 435 to send, by the cryptography agent to the client application, the third token. For example, the step 435 may be performed by the cryptography agent 14, which sends the token R2 to the client application 12.

The method 400 includes a step 440 to send, by the cryptography agent to the secure server, a request to fetch confidential information. The request contains the public key and the second token. For example, the step 440 may be performed by the cryptography agent 14, which sends the fetch request (e.g., to fetch cryptographic keys for the client application) to the KMS 20. The fetch request contains the public key and the token R1.

The method 400 includes a step 445 to receive, by the cryptography agent from the secure server, the confidential information, the confidential information being encrypted by the public key. For example, the step 445 may be performed by the cryptography agent 14, which receives the confidential information (e.g., the cryptographic keys) from the KMS 20, where the confidential information is encrypted by the public key.

The method 400 includes a step 450 to seal, by the cryptography agent, the confidential information inside the secure enclave. For example, the step 450 may be performed by the cryptography agent 14, which uses the seal keys to seal the confidential information (e.g., the cryptographic keys) inside the enclave 16.

The method 400 includes a step 455 to receive, by the cryptography agent from the client application, one or more operational commands along with the third token. For example, the step 455 may be performed by the cryptography agent 14, which receives the operational commands from the client application 12. The token R2 is provided by the client application along with the operational commands.

The method 400 includes a step 460 to validate, by the cryptography agent, the client application based on the received third token. For example, the step 460 may be performed by the cryptography agent 14, which validates the client application 12 based on the received token R2.

The method 400 includes a step 465 to perform, in response to a successful validation of the client application, one or more operations according to the received one or more operational commands. The one or more operations are performed by the cryptography agent within the secure enclave. For example, the step 465 may be performed by the cryptography agent 14, which in response to the client application being successfully validated, performs the operations according to the received operational commands inside the enclave 16.

In some embodiments, the client application, the cryptography agent, and the secure enclave are executing on a same machine. The client application and the cryptography agent reside in an unencrypted portion of an electronic memory of the same machine. The secure enclave resides in an encrypted portion of the electronic memory of the same machine.

In some embodiments, the second token has a longer time duration than the first token.

In some embodiments, the application context comprises a set of policies. A determination is made, by the cryptography agent based on the set of policies, whether the client application is authorized to communicate with the secure server or authorized to perform one or more cryptographic operations. In some embodiments, based on the set of policies, the cryptography agent deletes one or more keys previously granted to the client application by the secure server. The one or more keys are stored on a machine on which the client application resides.

In some embodiments, the secure enclave comprises one or more seal keys that are directly fused into hardware of a machine on which the secure enclave resides. In some embodiments, the private key and the second token are sealed by encrypting the private key and the second token using the one or more seal keys.

In some embodiments, the third token is generated at least in part by encrypting the second token with the public key.

In some embodiments, the confidential information comprises one or more cryptographic keys.

In some embodiments, none of the confidential information received by the cryptography agent from the secure server is in plain text format.

In some embodiments, the secure enclave comprises one or more seal keys that are directly fused into hardware of a machine on which the secure enclave resides. In some embodiments, the confidential information is sealed by decrypting the confidential information using the private key and encrypting the decrypted confidential information using the one or more seal keys.

In some embodiments, the one or more operational commands are in plain text format and comprise: encrypt, decrypt, sign, or verify.

In some embodiments, the client application is validated by decrypting the third token, decrypting the second token, comparing the decrypted third token and the decrypted second token, and performing the successful validation of the client application based on the comparing indicating that the decrypted third token matches the decrypted second token.

It is understood that additional method steps may be performed before, during, or after the steps 410-465 discussed above. For example, the method 400 may include a step that is performed before the sending of the first token, where the step registers the client application with the secure server. The first token is received by the client application from the secure server as a part of the registering. For reasons of simplicity, other additional steps are not discussed in detail herein. In some embodiments, one or more of the steps 410-465 may also be omitted. In some embodiments, the steps 410-465 are performed by one or more hardware processors, which may be used along with software code to implement at least the cryptography agent.

Figure 5:
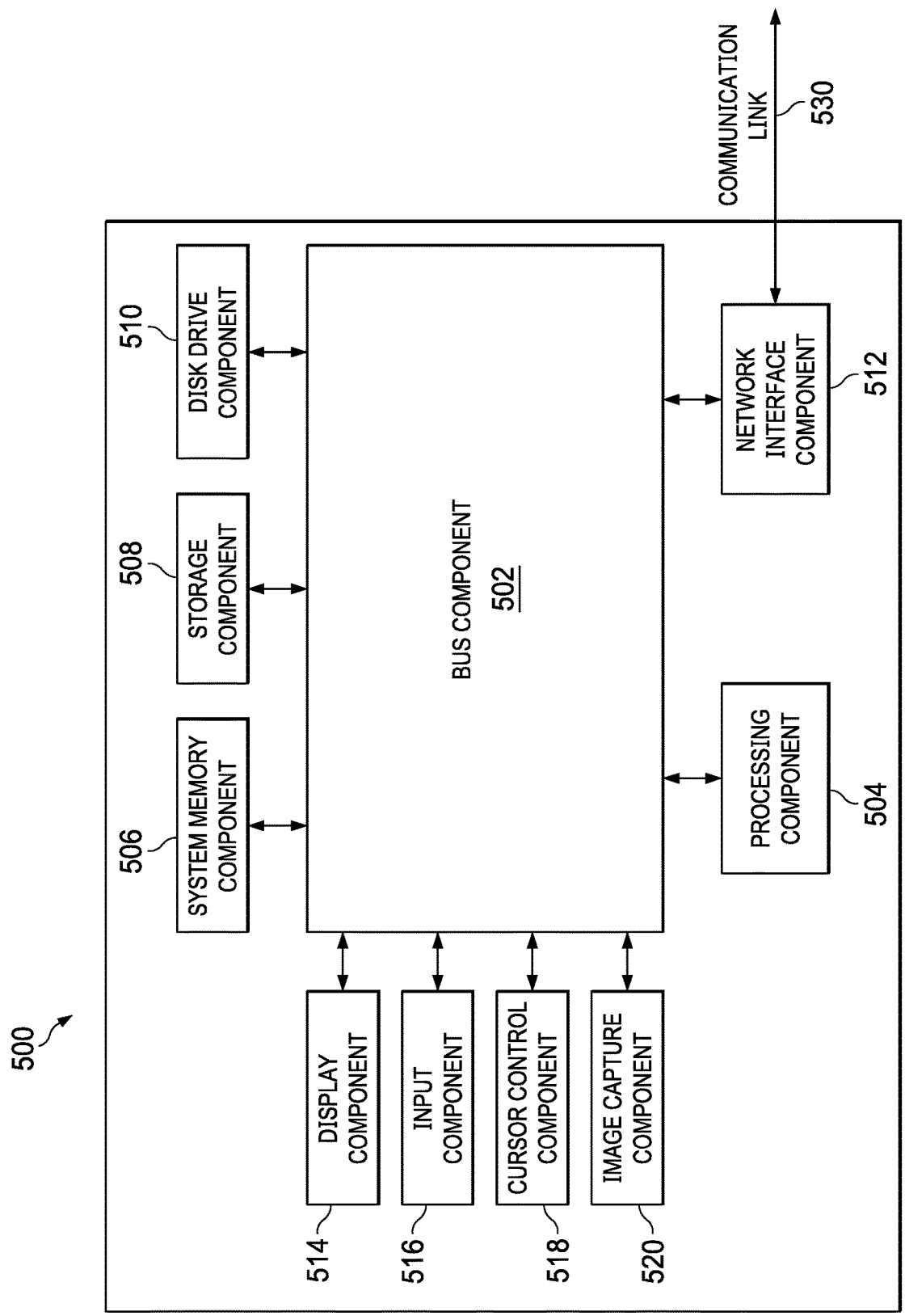
FIG. 5 is a computer system according to various aspects of the present disclosure.

FIG. 5 is a block diagram of a computer system 500 suitable for implementing various methods and devices described herein, for example, the client application 12, the cryptography agent 14, the enclave 16, or the KMS 20, or portions thereof. In various implementations, the devices capable of performing the steps may comprise a network communications device (e.g., mobile cellular phone, laptop, personal computer, tablet, etc.), a network computing device (e.g., a network server, a computer processor, an electronic communications interface, etc.), or another suitable device. It should be appreciated that the devices capable of implementing the method steps of the method 400 discussed above may be implemented as the computer system 500 in a manner as follows.

In accordance with various embodiments of the present disclosure, the computer system 500, such as a network server or a mobile communications device, includes a bus component 502 or other communication mechanisms for communicating information, which interconnects subsystems and components, such as a computer processing component 504 (e.g., processor, micro-controller, digital signal processor (DSP), etc.), system memory component 506 (e.g., RAM), static storage component 508 (e.g., ROM), disk drive component 510 (e.g., magnetic or optical), network interface component 512 (e.g., modem or Ethernet card), display component 514 (e.g., cathode ray tube (CRT) or liquid crystal display (LCD)), input component 516 (e.g., keyboard), cursor control component 518 (e.g., mouse or trackball), and image capture component 520 (e.g., analog or digital camera). In one implementation, disk drive component 510 may comprise a database having one or more disk drive components.

In accordance with embodiments of the present disclosure, computer system 500 performs specific operations by the processor 504 executing one or more sequences of one or more instructions contained in system memory component 506. Such instructions may be read into system memory component 506 from another computer readable medium, such as static storage component 508 or disk drive component 510. In other embodiments, hard-wired circuitry may be used in place of (or in combination with) software instructions to implement the present disclosure. In some embodiments, the various components of the client application 12 or the cryptography agent 14 may be in the form of software instructions that can be executed by the processor 504 to automatically perform context-appropriate tasks on behalf of a user.

Logic may be encoded in a computer readable medium, which may refer to any medium that participates in providing instructions to the processor 504 for execution. Such a medium may take many forms, including but not limited to, non-volatile media and volatile media. In one embodiment, the computer readable medium is non-transitory. In various implementations, non-volatile media includes optical or magnetic disks, such as disk drive component 510, and volatile media includes dynamic memory, such as system memory component 506. In one aspect, data and information related to execution instructions may be transmitted to computer system 500 via a transmission media, such as in the form of acoustic or light waves, including those generated during radio wave and infrared data communications. In various implementations, transmission media may include coaxial cables, copper wire, and fiber optics, including wires that comprise bus 502.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read. These computer readable media may also be used to store the programming code for the client application 12, the cryptography agent 14, or the enclave 16 discussed above.

In various embodiments of the present disclosure, execution of instruction sequences to practice the present disclosure may be performed by computer system 500. In various other embodiments of the present disclosure, a plurality of computer systems 500 coupled by communication link 530 (e.g., a communications network, such as a LAN, WLAN, PTSN, and/or various other wired or wireless networks, including telecommunications, mobile, and cellular phone networks) may perform instruction sequences to practice the present disclosure in coordination with one another.

Computer system 500 may transmit and receive messages, data, information and instructions, including one or more programs (i.e., application code) through communication link 530 and communication interface 512. Received program code may be executed by computer processor 504 as received and/or stored in disk drive component 510 or some other non-volatile storage component for execution. The communication link 530 and/or the communication interface 512 may be used to conduct electronic communications between the various devices herein, for example, between the cryptography agent 14 and the KMS 20.

Where applicable, various embodiments provided by the present disclosure may be implemented using hardware, software, or combinations of hardware and software. Also, where applicable, the various hardware components and/or software components set forth herein may be combined into composite components comprising software, hardware, and/ or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as computer program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein. It is understood that at least a portion of the client application 12 or the cryptography agent 14 may be implemented as such software code in some embodiments.

Figure 6:
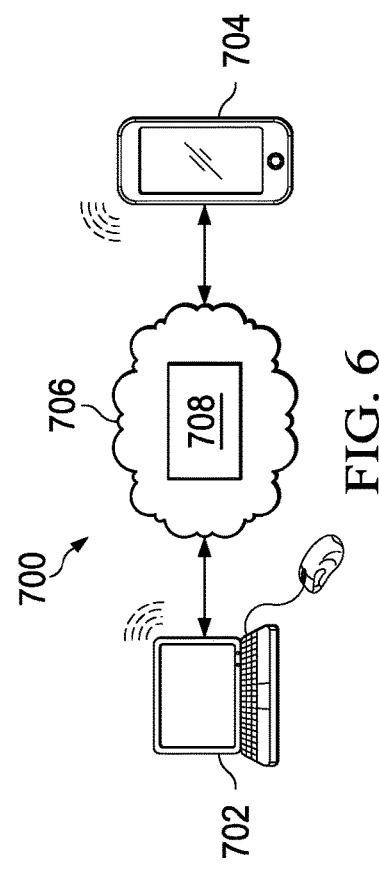
FIG. 6 is a simplified example of a cloud-based computing architecture according to various aspects of the present disclosure.

FIG. 6 illustrates an example cloud-based computing architecture 700, which may also be used to implement various aspects of the present disclosure. The cloud-based computing architecture 700 includes a mobile device 704 (e.g., the user device 110 of FIG. 3) and a computer 702 (e.g., the merchant server 140 or the payment provider server 170), both connected to a computer network 706 (e.g., the Internet or an intranet). In one example, a consumer has the mobile device 704 that is in communication with cloud-based resources 708, which may include one or more computers, such as server computers, with adequate memory resources to handle requests from a variety of users. A given embodiment may divide up the functionality between the mobile device 704 and the cloud-based resources 708 in any appropriate manner. For example, an app on mobile device 704 may perform basic input/output interactions with the user, but a majority of the processing may be performed by the cloud-based resources 708. However, other divisions of responsibility are also possible in various embodiments. In some embodiments, using this cloud architecture, the client application 12 or the cryptography agent 14 may reside on the merchant server 140 or on the payment provider server 170, but its functionalities can be accessed or utilized by the mobile device 704, or vice versa.

The cloud-based computing architecture 700 also includes the personal computer 702 in communication with the cloud-based resources 708. In one example, a participating merchant or consumer/user may access information from the cloud-based resources 708 by logging on to a merchant account or a user account at computer 702. The system and method for performing the machine learning process as discussed above may be implemented at least in part based on the cloud-based computing architecture 700.

It is understood that the various components of cloud-based computing architecture 700 are shown as examples only. For instance, a given user may access the cloud-based resources 708 by a number of devices, not all of the devices being mobile devices. Similarly, a merchant or another user may access the cloud-based resources 708 from any number of suitable mobile or non-mobile devices. Furthermore, the cloud-based resources 708 may accommodate many merchants and users in various embodiments.

Based on the above discussions, the present disclosure offers several significant advantages over conventional methods and systems. It is understood, however, that not all advantages are necessarily discussed in detail herein, as different embodiments may offer different advantages, and that no particular advantage is required for all embodiments. One advantage is improved functionality of a computer. For example, conventional computer systems on the client side lack the expensive server-grade hardware-based security protection, and confidential information stored on the conventional client-side computers may be vulnerable to hacking or other electronic attacks, particularly since the confidential information may be stored as plaintext data on the client side computer. Once a malicious actor gains access to the confidential information from a client application, it may compromise not just that client application, but also other client applications that share the same confidential information.

Here, the present disclosure implements a cryptography agent to serve as an intermediary on behalf of the client application, so that the client application does not have direct access to the confidential information. The cryptography agent seals the confidential information (sent from a secure server and generated for the client application) in a secure enclave that resides in a secure or trusted portion of the client-side computer. Using seal keys that are directly fused into the hardware resources (e.g., motherboard) of the client-side computer, the cryptography agent seals and stores the confidential information, for example, by encrypting the confidential information with the seal keys. When the client application wishes to perform operations that rely on the confidential information, it sends a request to the cryptography agent, which will perform the operations (on the client application's behalf) using the confidential information within the enclave. As such, there is little to no risk of improperly exposing or compromising the confidential information, even though it is stored on the client side. Hence, the electronic security of the client-side computer is greatly enhanced, which is an improvement in the functionality of the client-side computer.

As another example of the enhanced electronic security of the client-side computer, the cryptography agent generates a key pair including a private key and a public key. Using the key pair, the cryptography agent can also encrypt a token that is generated by the secure server for the client application and sent to the cryptography agent. The cryptography agent sends the encrypted token to the client application, which may then supply the encrypted token along with its requests to perform operations, such that the encrypted token may be used by the cryptography agent as a validation or authentication token to ensure that the client application is indeed authorized to perform the requested operations. By encrypting such a token, and using the encrypted token effectively as a validation/authentication token for the client application, the electronic security (and thus the functionality) of the client-side computer is further improved, since a malicious actor is unable to impersonate the client application to get the cryptography agent to perform certain operations.

As a further example of the enhanced electronic security of the client-side computer, the present disclosure implements a policy check, where the cryptography agent can check the latest policy update given by the server side to determine whether the client application is still authorized to perform certain tasks. If the policy check indicates that the keys (or other confidential information) previously granted to the client application (and now stored locally on the client computers) should be deleted, the cryptography agent may delete the keys accordingly. As such, malicious actors cannot improperly access the keys for client applications that are no longer actively running. Such a functionality—being able to delete the confidential information locally from the client side—was missing in traditional implementations of the client computers. Thus, the functionality of the computer is further improved by the present disclosure.

The problems addressed by the present disclosure also arise in a specific technological environment, for example in an environment directed to electronic information security, and specifically to gaps in protection on client-side computers. For example, the present disclosure specifically addresses and overcomes the problem of the confidential information being accessible in plaintext format on client-side computers. Here, by using a cryptography agent that interacts with a secure hardware-based enclave, the client application is unable to access the confidential information in plaintext, since the confidential information is not directly accessible by the client application, and it is also sealed (e.g., encrypted) inside the enclave with hardware-based seal keys.

The inventive ideas of the present disclosure are also integrated into a practical application, for example into the cryptography agent 14 and/or the enclave 16 discussed above. Such a practical application can provide server-grade hardware-based security protection to the client-side computers at a low cost.

It should be appreciated that like reference numerals are used to identify like elements illustrated in one or more of the figures, wherein these labeled figures are for purposes of illustrating embodiments of the present disclosure and not for purposes of limiting the same.

One aspect of the present disclosure involves a method that includes the following steps: sending, by a cryptography agent to a secure server, a first token that is received from a client application; receiving, by the cryptography agent from the secure server, a second token that defines an application context associated with the client application; generating, by the cryptography agent, a public key and a private key for the client application; sealing, by the cryptography agent, the private key and the second token inside a secure enclave; receiving, by the cryptography agent, a third token that is generated within the secure enclave at least in part by encrypting information of the second token; sending, by the cryptography agent to the client application, the third token; sending, by the cryptography agent to the secure server, a request to fetch confidential information, the request containing the public key and the second token; receiving, by the cryptography agent from the secure server, the confidential information, the confidential information being encrypted by the public key; sealing, by the cryptography agent, the confidential information inside the secure enclave; receiving, by the cryptography agent from the client application, one or more operational commands along with the third token; validating, by the cryptography agent, the client application based on the received third token; and performing, in response to a successful validation of the client application, one or more operations according to the received one or more operational commands, the one or more operations being performed by the cryptography agent within the secure enclave.

Another aspect of the present disclosure involves a system that includes an enclave that resides in an encrypted portion of a computer server, the enclave storing one or more seal keys that are directly fused into hardware of the computer server. The system includes a client application that resides in an unencrypted portion of the computer server. The client application is prevented from communicating directly with the enclave. The system also includes a cryptographic agent that resides in the unencrypted portion of the computer server and that is configured to communicate with the enclave on behalf of the client application. The cryptographic agent is further configured to perform operations that includes: receiving, in response to a successful authentication of the client application by a server secure, an application context associated with the client application; generating a public key and a private key for the client application; sealing the private key and the application context within the enclave using the one or more seal keys; sending an encrypted version of the application context to the client application; sending, to the secure server, a first request to fetch confidential information on behalf of the client application, the first request containing the public key and the application context; receiving, from the secure server, an encrypted version of the confidential information, the confidential information being encrypted by the public key; sealing the confidential information within the enclave using the one or more seal keys; receiving a second request to perform one or more operations from the client application, the second request containing the encrypted version of the application context; validating the client application based on the received encrypted version of the application context; and performing, in response to a successful validation of the client application, the one or more operations within the enclave.

Yet another aspect of the present disclosure involves a non-transitory machine-readable medium having stored thereon machine-readable instructions executable to cause a machine to perform operations comprising: receiving, by a cryptography agent, a first token that is obtained by a client application as a part of a registration with a secure server, wherein the cryptography agent and the client application each reside in an untrusted portion of a machine that is different from the secure server; forwarding, to the secure server, a first request to authenticate the client application, wherein the first request includes the first token; receiving, from the secure server in response to a successful authentication of the client application, a second token that defines an application context corresponding to the client application; generating a key pair that includes a public key and a private key for the client application; encrypting the private key and the second token using one or more seal keys that are directly fused into a hardware component of the machine; storing the encrypted private key and the encrypted second token within a trusted portion of the machine; sending the encrypted second token to the client application; forwarding, to the secure server, a second request from the client to fetch confidential information, the second request containing the public key and the second token; receiving the confidential information from the secure server, the confidential information being encrypted by the public key; encrypting the confidential information using the one or more seal keys; storing the encrypted confidential information inside the trusted portion of the machine; receiving, from the client application, one or more operational commands along with the encrypted second token; validating the client application based on the received encrypted second token; performing, by the cryptography agent in response to a successful validation of the client application, one or more operations within the trusted portion of the machine according to the received one or more operational commands; and sending a result of the one or more operations to the client application.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:
1. A method, comprising:
sending, by a cryptography agent to a secure server, a first token that is received from a client application;
receiving, by the cryptography agent from the secure server, a second token that defines an application context associated with the client application;

generating, by the cryptography agent, a public key and a private key for the client application;
sealing, by the cryptography agent, the private key and the second token inside a secure enclave;
receiving, by the cryptography agent from the secure enclave, a third token that is generated within the secure enclave at least in part by encrypting information of the second token;
sending, by the cryptography agent to the client application, the third token;
sending, by the cryptography agent to the secure server, a request to fetch confidential information, the request containing the public key and the second token;
receiving, by the cryptography agent from the secure server, the confidential information, the confidential information being encrypted by the public key;
sealing, by the cryptography agent, the confidential information inside the secure enclave;
receiving, by the cryptography agent from the client application, one or more operational commands along with the third token;
validating, by the cryptography agent, the client application based on the received third token; and
performing, in response to a successful validation of the client application, one or more operations according to the received one or more operational commands, the one or more operations being performed by the cryptography agent within the secure enclave.

2. The method of claim 1, wherein:
the client application, the cryptography agent, and the secure enclave are executing on a same machine;
the client application and the cryptography agent reside in an unencrypted portion of an electronic memory of the same machine; and
the secure enclave resides in an encrypted portion of the electronic memory of the same machine.

3. The method of claim 1, further comprising: before the sending of the first token, registering the client application with the secure server, wherein the first token is received by the client application from the secure server as a part of the registering.

4. The method of claim 1, wherein the second token has a longer time duration than the first token.

5. The method of claim 1, wherein the application context comprises a set of policies, and wherein the method further comprises: determining, by the cryptography agent based on the set of policies, whether the client application is authorized to communicate with the secure server or authorized to perform one or more cryptographic operations.

6. The method of claim 5, further comprising: deleting, by the cryptography agent based on the set of policies, one or more keys previously granted to the client application by the secure server, wherein the one or more keys are stored on a machine on which the client application resides.

7. The method of claim 1, wherein:
the secure enclave comprises one or more seal keys that are directly fused into hardware of a machine on which the secure enclave resides; and
the sealing the private key and the second token comprises encrypting the private key and the second token using the one or more seal keys.

8. The method of claim 1, wherein the third token is generated at least in part by encrypting the second token with the public key.

9. The method of claim 1, wherein the confidential information comprises one or more cryptographic keys.

10. The method of claim 1, wherein none of the confidential information received by the cryptography agent from the secure server is in plain text format.

11. The method of claim 1, wherein:
the secure enclave comprises one or more seal keys that are directly fused into hardware of a machine on which the secure enclave resides; and
the sealing the confidential information comprises: decrypting the confidential information using the private key and encrypting the decrypted confidential information using the one or more seal keys.

12. The method of claim 1, wherein the one or more operational commands are in plain text format and comprise: encrypt, decrypt, sign, or verify.

13. The method of claim 1, wherein the validating comprises:
decrypting the third token;
decrypting the second token;
comparing the decrypted third token and the decrypted second token; and
performing the successful validation of the client application based on the comparing indicating that the decrypted third token matches the decrypted second token.

14. A system, comprising:
an enclave that resides in an encrypted portion of a computer server, the enclave storing one or more seal keys that are directly fused into hardware of the computer server;
a client application that resides in an unencrypted portion of the computer server, wherein the client application is prevented from communicating directly with the enclave; and
a cryptographic agent that resides in the unencrypted portion of the computer server and that is configured to communicate with the enclave on behalf of the client application, wherein the cryptographic agent is further configured to perform operations that include:
receiving, in response to a successful authentication of the client application by a secure server, an application context associated with the client application;
generating a public key and a private key for the client application;
sealing the private key and the application context within the enclave using the one or more seal keys;
accessing an encrypted version of the application context that is generated within the enclave;
sending the encrypted version of the application context to the client application;
sending, to the secure server, a first request to fetch information on behalf of the client application, the first request containing the public key and the application context;
receiving, from the secure server, an encrypted version of the information, the information being encrypted by the public key;
sealing the information within the enclave using the one or more seal keys;
receiving a second request to perform one or more operations from the client application, the second request containing the encrypted version of the application context;
validating the client application based on the received encrypted version of the application context; and
performing, in response to a successful validation of the client application, the one or more operations within the enclave.

15. The system of claim 14, wherein the application context is received along with a set of policies, and wherein the operations further include:
- determining, based on the received set of policies, whether one or more keys previously granted to the client application and currently stored on the computer server should be revoked; and
- deleting the one or more keys from the computer server in response to a determination that the one or more keys should be revoked.

16. The system of claim 14, wherein the validating is performed at least in part by determining whether a content of the received encrypted version of the application context matches a content of the application context that is sealed within the enclave.

17. The system of claim 14, wherein the computer server is a first computer server, and wherein the system further comprises a second computer server that communicates with the cryptographic agent, but not directly with the client application or the enclave, to provide the application context and the information to the cryptographic agent.

18. A non-transitory machine-readable medium having stored thereon machine-readable instructions executable to cause a machine to perform operations comprising:
- receiving, by a cryptography agent, a first token that is obtained by a client application as a part of a registration with a secure server, wherein the cryptography agent and the client application each reside in an untrusted portion of a machine that is different from the secure server;
- forwarding, to the secure server, a first request to authenticate the client application, wherein the first request includes the first token;
- receiving, from the secure server in response to a successful authentication of the client application, a second token that defines an application context corresponding to the client application;
- generating a key pair that includes a public key and a private key for the client application;
- encrypting the private key and the second token using one or more seal keys that are directly fused into a hardware component of the machine;
- storing the encrypted private key and the encrypted second token within a trusted portion of the machine;
- receiving, from the trusted portion of the machine, the encrypted second token;
- sending the encrypted second token to the client application;
- forwarding, to the secure server, a second request from the client to fetch a first type of information, the second request containing the public key and the second token;
- receiving the confidential information from the secure server, the first type of information being encrypted by the public key;
- encrypting the first type of information using the one or more seal keys;
- storing the encrypted first type of information inside the trusted portion of the machine;
- receiving, from the client application, one or more operational commands along with the encrypted second token;
- validating the client application based on the received encrypted second token;
- performing, by the cryptography agent in response to a successful validation of the client application, one or more operations within the trusted portion of the machine according to the received one or more operational commands; and
- sending a result of the one or more operations to the client application.

19. The non-transitory machine-readable medium of claim 18, wherein the application context is associated with a set of policies, and wherein the operations further comprise:
- deleting, from the machine based on the set of policies, one or more keys previously granted to the client application by the secure server.

20. The non-transitory machine-readable medium of claim 18, wherein the validating is performed at least in part by comparing a content of the encrypted second token received from the client application with a content of the encrypted second token that is stored within the trusted portion of the machine.

* * * * *